April 7, 1959      F. M. TOWNSEND      2,881,047
METHOD OF SIMULTANEOUSLY REMOVING HYDROGEN
SULFIDE FROM GASEOUS MIXTURES AND
PRODUCING SULFUR THEREFROM
Filed May 29, 1956      4 Sheets-Sheet 1
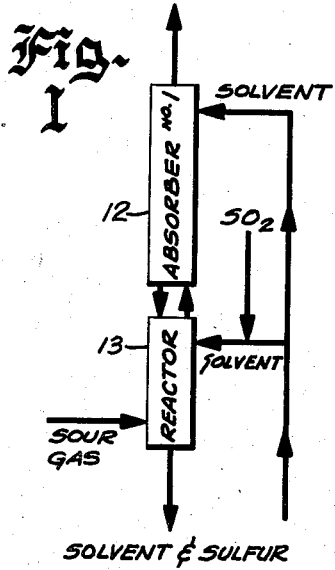
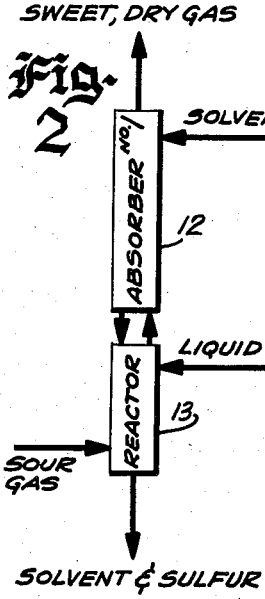
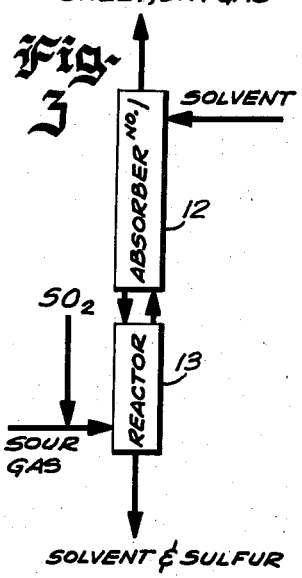
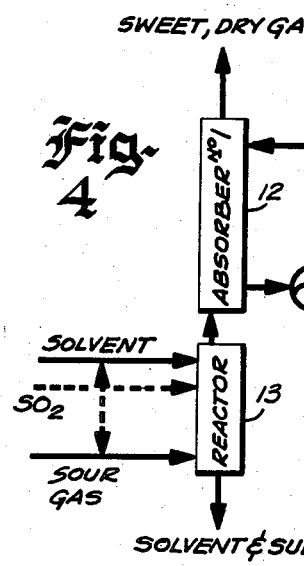
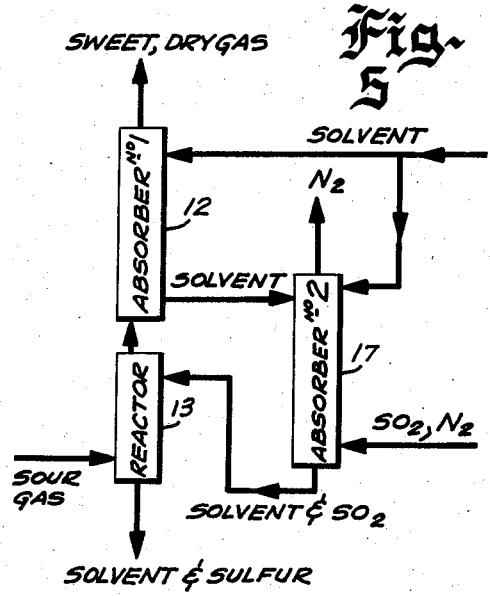
INVENTOR.
FRANCIS M. TOWNSEND
BY
ATTORNEYS April 7, 1959
F. M. TOWNSEND
2,881,047
METHOD OF SIMULTANEOUSLY REMOVING HYDROGEN
SULFIDE FROM GASEOUS MIXTURES AND
PRODUCING SULFUR THEREFROM
Filed May 29, 1956
4 Sheets-Sheet 2
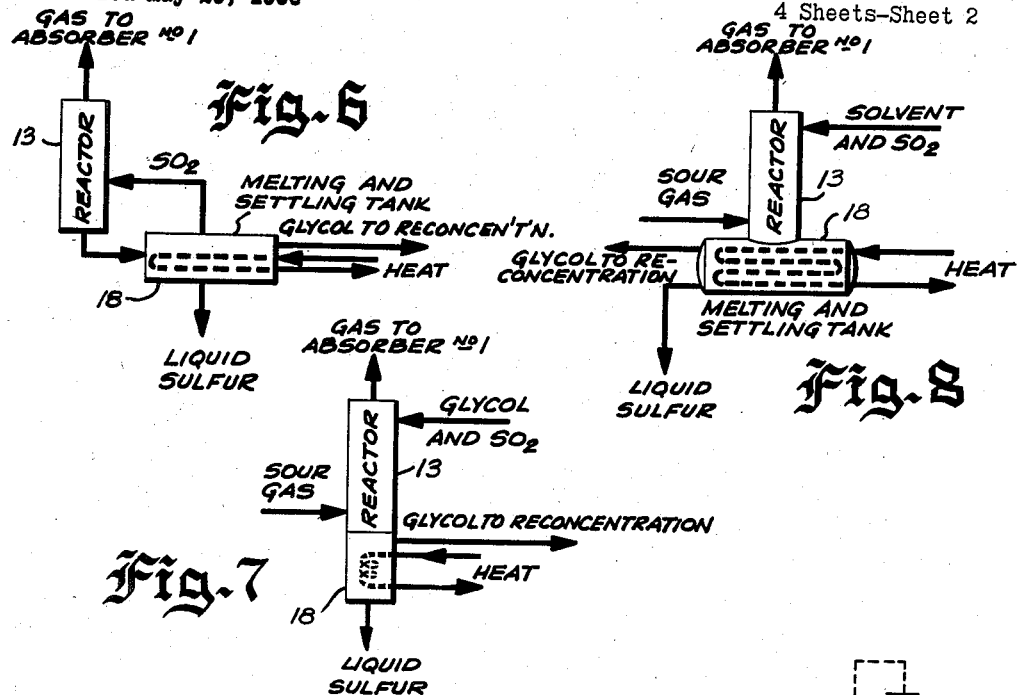
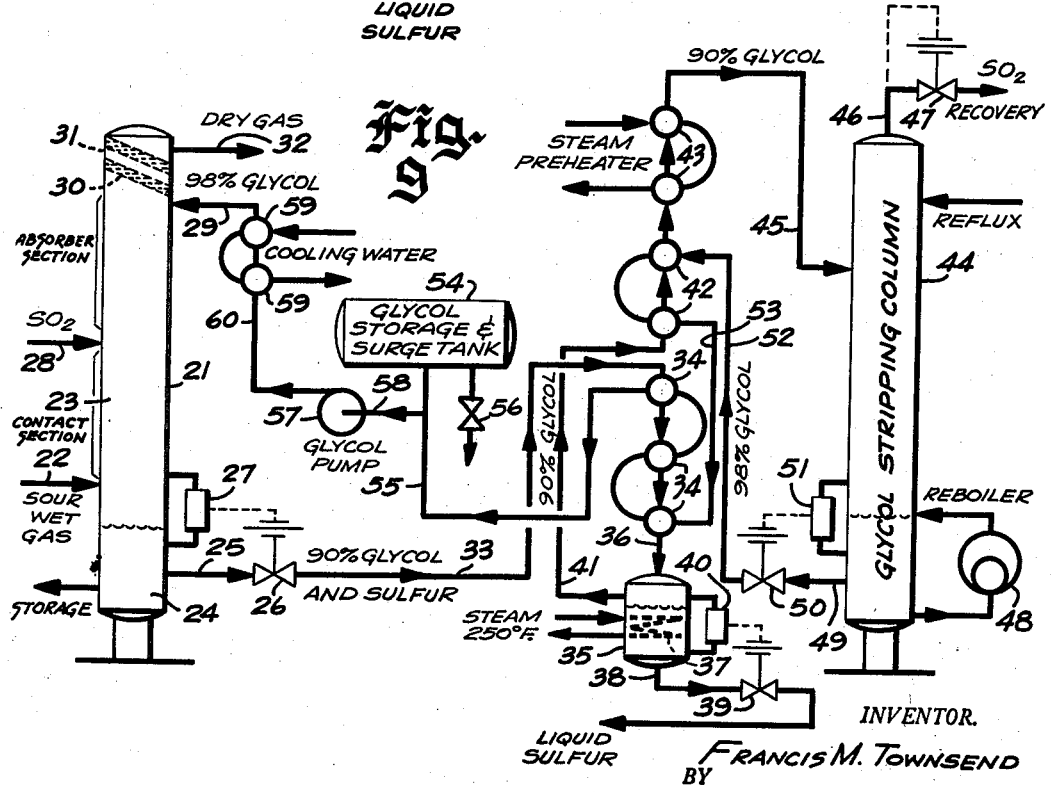
INVENTOR.
FRANCIS M. TOWNSEND
BY
Mason, Kolehmainen, Rathburn and Wyss
ATTORNEYS INVENTOR
FRANCIS M. TOWNSEND
by Mason, Kolehmainen, Rathburn and Wyss
ATTORNEYS

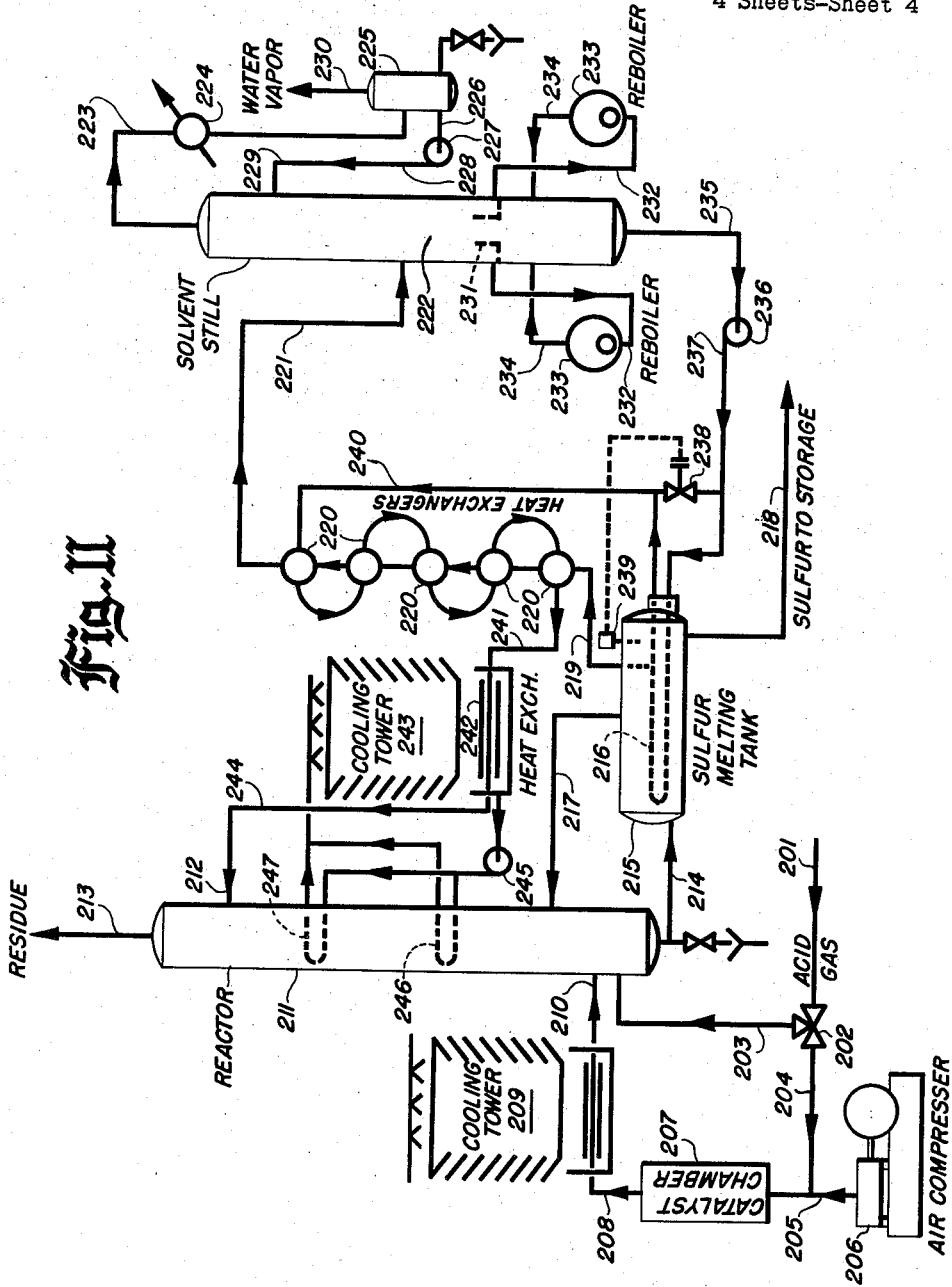

United States Patent Office 2,881,047
Patented Apr. 7, 1959

2,881,047

METHOD OF SIMULTANEOUSLY REMOVING HYDROGEN SULFIDE FROM GASEOUS MIXTURES AND PRODUCING SULFUR THEREFROM

Francis Mark Townsend, Norman, Okla., assignor to Laurence S. Reid, Norman, Okla.

Application May 29, 1956, Serial No. 587,991

24 Claims. (Cl. 23—3)

This invention relates to a new process for the recovery of sulfur from sour gas mixtures. More particularly, this invention relates to a process for removing hydrogen sulfide from sour natural gas and recovering, as elemental sulfur, the sulfur content of the hydrogen sulfide.

This application is a continuation-in-part of my co-pending application, serial No. 392,650, filed November 17, 1953.

Numerous workers in this art have investigated the basic method for recovering sulfur from hydrogen sulfide, according to the equations:

$$(1) \quad S + O_2 \longrightarrow SO_2$$
$$(2) \quad 2H_2S + SO_2 \longrightarrow 3S + 2H_2O$$
$$(3) \quad 2H_2S + O_2 \longrightarrow 2S + 2H_2O$$
$$(4) \quad H_2S + 3/2\, O_2 \longrightarrow SO_2 + H_2O$$
$$(2) \quad 2H_2S + SO_2 \longrightarrow 3S + 2H_2O$$
$$(3) \quad 2H_2S + O_2 \longrightarrow 2S + 2H_2O$$

Until this invention, no process has been developed around these basic reactions which is economically attractive for relatively small scale production, or for removing the hydrogen sulfide from gases in which it was present only in minute amounts.

The Claus process, for example, makes use of these reactions. To practice the Claus process, a sour gas mixture must be treated by the Girbotol process, wherein an aqueous solution of mono-, or di-, or tri-ethanolamine reacts with the hydrogen sulfide and carbon dioxide components of the gas mixture and effects their removal. These acid gases are then released from the amine solution by heat. In the Claus process, one-third of this acid gas mixture is separated and oxidized to form the proper amount of sulfur dioxide to enter into the reaction in the equations above. The remaining hydrogen sulfide and this sulfur dioxide are then combined and the reaction between them is catalyzed by their passage through a bed of bauxite. The reaction temperature during passage through the catalyst is sufficiently high that the sulfur formed by the reaction remains in vapor form. The sulfur vapors are then condensed, recovered, and stored in liquid or solid state. While this process looks attractive from a theoretical standpoint, it has many undesirable features as a commercial process. For example, the amine absorption process for removing hydrogen sulfide from the feed gas requires a relatively high capital investment, and entails high maintenance costs, due to corrosion, particularly where carbon dioxide is present in the feed gas in appreciable percentages and is absorbed by the amine solutions, along with the hydrogen sulfide, and liberated as carbonic acid. In many instances, the carbon dioxide content of the acid gas mixture is so great that it is impossible to oxidize this gas to produce the sulfur dioxide requirement without adding substantial amounts of natural gas to form a combustible mixture. Usually, the addition of this hydrocarbon gas causes carbon deposition on the catalyst, reducing its effectiveness progressively to the point where it becomes inoperative. The minimum economic capacity for a plant of this type with a single catalyst chamber is from 8 to 10 tons of elemental sulfur per day. Where a higher recovery efficiency is desired, two catalyst chambers are installed in series with sulfur condensers and a gas re-heater between chambers. In this instance the minimum economic capacity is about 25 tons of elemental sulfur per day.

The object of this invention is to provide a more efficient, and less expensive, single-stage process for the recovery of elemental sulfur from gases containing hydrogen sulfide, which process will have a relatively low minimum economic capacity in terms of tons of elemental sulfur per day.

A further object of the invention is to provide new media for the reaction between hydrogen sulfide and sulfur dioxide in which the sulfur produced by the reaction is formed rapidly and in such particle size as to be readily recoverable.

Another object of the invention is to provide a process for the removal of hydrogen sulfide from sour gases in which the reaction medium is insensitive to carbon dioxide, and does not remove carbon dioxide from the feed gas.

Another object of the invention is to provide a process for the simultaneous dehydration and desulfurization of sour gas and for the recovery of elemental sulfur therefrom.

Still another object of the invention is to provide a process for the effective removal of hydrogen sulfide from natural gas and other gases, even when there is so little hydrogen sulfide present that sulfur must be procured from an extraneous source in order to supply the sulfur dioxide requirement.

These and other objects of the invention are accomplished by a process in which the sour gas, meaning any gaseous mixture containing hydrogen sulfide, is sweetened by flowing it in intimate contact with a solution of sulfur dioxide in a concentrated aqueous solution of a neutral, inert, stable, organic solvent having a vapor pressure at 20° C. of not more than about 10 millimeters of mercury and wherein the solubility of water in the organic solvent is at least about 2% by weight at 20° C. and preferably not less than about 5% by weight at 20° C. The aqueous solution of the organic solvent acts both as a catalyst and as a medium for the reaction between hydrogen sulfide and sulfur dioxide. The reaction is virtually instantaneous, and particles of sulfur are formed and dispersed in the solution. These particles may be easily separated from the aqueous organic solvent to remove and to recover elemental sulfur from the process.

The fundamental reaction of the invention may be demonstrated on a laboratory scale by dissolving sulfur dioxide in a concentrated aqueous solution of triethylene glycol, for example, until a distinct yellow color is obtained. If hydrogen sulfide, from the reaction of a strong acid and sodium sulfide, is then passed through the solution, a cloudy dispersion of precipitated sulfur forms immediately. Upon standing, the sulfur will settle and is recoverable.

The basic innovation upon which the success of this invention depends is the use of a concentrated, aqueous solution of an organic solvent having the properties set forth above, as the reaction medium. Any neutral, stable, inert organic solvent having the specified vapor pressure and solubility properties may be used in the process, so long as the organic solvent contains at least two hetero atoms (i.e., atoms of elements other than hydrogen and carbon), at least one of which is a lower chalcogen such as oxygen or sulfur, and so long as the number of vicinyl hydroxyl radicals does not exceed two. The hetero atoms appear necessary to provide sufficient solubility of sulfur dioxide in the organic solvents. Solvents with three or more vicinyl hydroxyl groups are unsatisfactory, due to instability and decomposition. With aqueous solutions of solvents within the class defined above, which are preferably at least 90% by weight organic material, the reaction between hydrogen sulfide and sulfur dioxide takes place immediately. Lower concentrations of organic solvents may be employed but the reaction rate is usually slower and the overall efficiency of the process may be correspondingly diminished unless this effect is compensated by more expensive modifications in process design and operation. The preferred concentration of organic solvent in water solution entering an absorber is about 96 to 99 percent by weight. The small amount of water present in the concentrated solution exercises its well-known catalytic effect on the reaction. However, the absorption by the organic solvents of the water produced by the reaction and the water absorbed from the inlet sour gas stream causes immediate diminution of the effect of such water upon the reaction rate insofar as there is any tendency for the presence of excess water to prevent the reaction from going to completion. In this respect, the solvents of the type defined above actually aid the reaction and force it to completion by removing one of the products, water, as it is formed.

Among the organic solvents which can be used in the process of this invention are the following:

Mercaptoethanol
Tetrahydropyran-2-methanol
Ethylene glycol
Diethylene glycol
Triethylene glycol
Tetraethylene glycol
3-thiapentanediol-1,5 (thiodiglycol)
Propylene glycol
Dipropylene glycol
3-methylpentanediol-1,5
Pentanediol-1,5
2-ethylhexanediol-1,3
Hexylene glycol
Octylene glycol
2-ethoxymethyl-2,4-dimethyl-pentanediol-1,5
2-methoxymethyl-2,4-dimethyl-pentanediol-1,5
2-methoxyethyl acetate
2-ethoxyethyl acetate
2-(2-ethoxyethoxy)ethyl acetate
2-(2-butoxyethoxy)ethyl acetate
Triethylene glycol monomethyl ether acetate
Ethylene glycol diacetate
Diethylene glycol diacetate
Di(2-methoxyethyl) maleate
Propylene carbonate
Diacetone alcohol
Acetonylacetone
Diethylene glycol diethyl ether
Ethylene glycol monomethyl ether
Ethylene glycol monoethyl ether
Ethylene glycol monobutyl ether
2-ethylbutyl 2-hydroxyethyl ether
Ethylene glycol mono-n-hexyl ether
Diethylene glycol monomethyl ether
Diethylene glycol monoethyl ether
Diethylene glycol monobutyl ether
Triethylene glycol monoethyl ether
Diethylene glycol mono-n-hexyl ether
Tetraethylene glycol dibutyl ether
Ethylene chlorhydrin
Propylene chlorhydrin
Polyethylene glycol chloride of molecular weight from 90 to 210
α-Methylbenzyl 2-hydroxyethyl ether
Diethylene glycol monophenyl ether
3-methoxybutanol
1,3-butylene glycol
1,4-butanediol Preferred among these solvents are the glycols, particularly diethylene glycol, triethylene glycol and propylene glycol, and ethers and esters thereof.

For a more complete understanding of the invention, reference is made to the drawings in which:

Fig. 1 is a flow diagram of a sweetening process embodying the present invention;

Fig. 2 is a flow diagram of a modified sweetening process;

Fig. 3 is a flow diagram of another modification;

Fig. 4 is a flow diagram of a fourth modification;

Fig. 5 is a flow diagram of a fifth modification of a sweetening process in accordance with this invention;

Fig. 6 is a flow diagram illustrating a method for recovering elemental sulfur from a sweetening process;

Fig. 7 is a flow diagram of another sulfur recovery method;

Fig. 8 is a flow diagram illustrating the sulfur recovery method of Fig. 7 with modified apparatus;

Fig. 9 is a flow diagram of a complete sweetening and sulfur recovery process;

Fig. 11 is a flow diagram of a complete sulfur recovery process for treating gas containing a high proportion of carbon dioxide and a relatively small proportion of hydrogen sulfide wherein the residue gas is relatively worthless and is vented.

Figure 10:
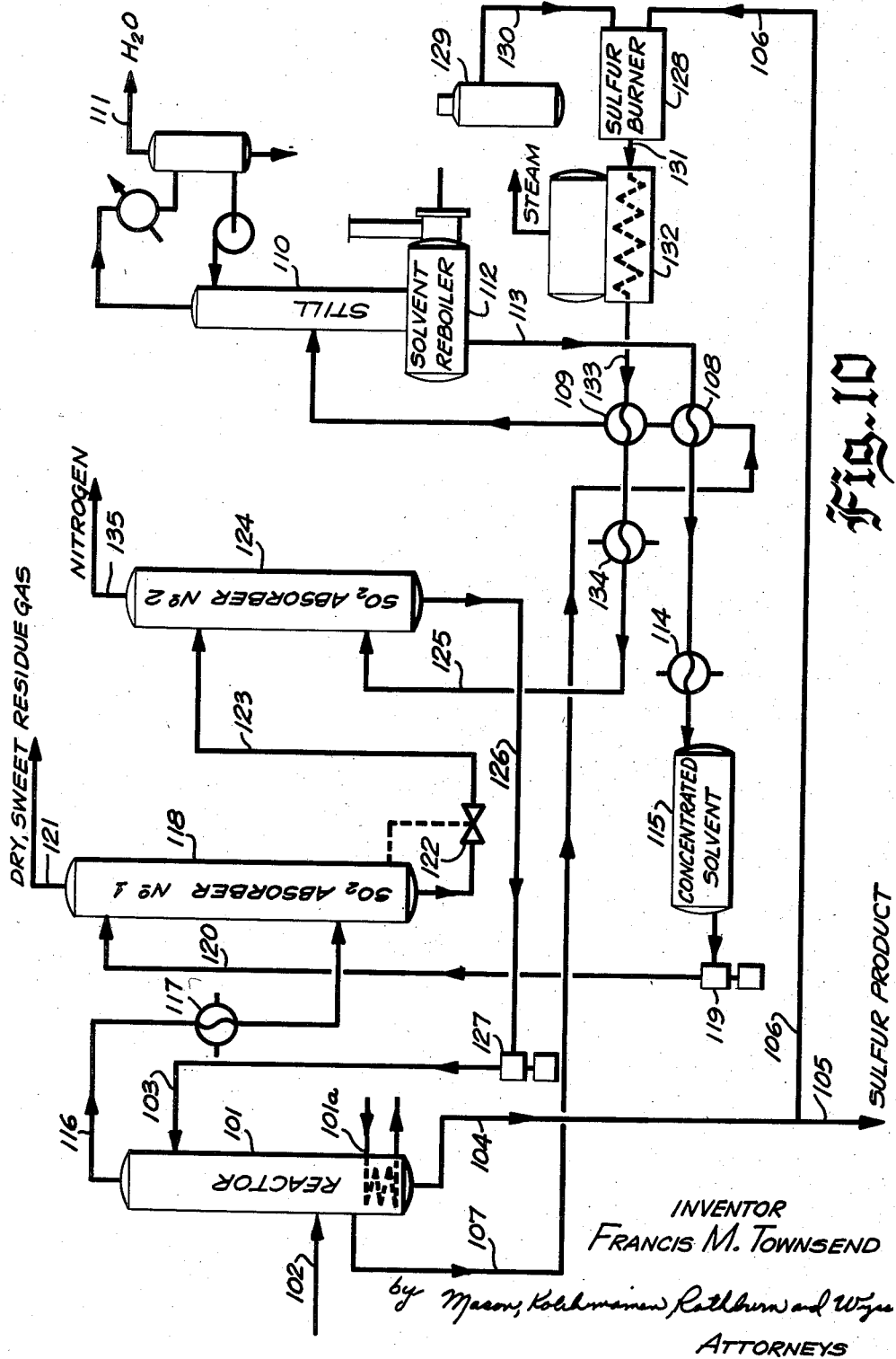
Fig. 10 is a flow diagram of another complete sweetening and sulfur recovery procedure in accordance with this invention.

The process is very flexible and may be operated with several variations. The sulfur dioxide may be pumped and dispersed into the sour gas entering the reactor, there to be contacted by and absorbed in a descending stream of aqueous solution of organic solvent. Or the sulfur dioxide may be introduced into the reactor at a point substantially below the concentrated organic solvent solution inlet, there to mix and react with the ascending sour gas. Or the sulfur dioxide may first be dissolved in a portion of the total stream of organic solvent and then pumped into the reactor at a point substantially below the inlet of the remaining portion of the organic solvent solution. Regardless of the procedure selected, the reaction takes place immediately and elemental sulfur is precipitated and dispersed in the descending solution.

Sulfur dioxide is soluble in aqueous, concentrated solutions of the organic solvents of the class defined herein. The solubility is such that sulfur dioxide may be substantially stripped from a carrier gas by contacting it with a concentrated, sulfur dioxide-free aqueous solution of such an organic solvent in a countercurrent absorber. However, for best results in the present process, the concentration of sulfur dioxide in the solution should be restricted to ten percent by weight, or less, in order to minimize the vapor pressure of the sulfur dioxide solution and possible resulting losses of sulfur dioxide due to its tendency to vaporize and escape.

The reaction between sulfur dioxide and hydrogen sulfide in an aqueous organic solvent can be conducted in a variety of ways and in a variety of equipment. One method is illustrated in Fig. 1 of the attached drawings, wherein the sulfur dioxide-free organic solvent solution, which may be a regenerated, recycled solution, is split into two portions. One portion of this solution is introduced into the top of a sulfur dioxide absorber 12, there to effect recovery of this component from the residue gas. The sulfur dioxide required for the reaction with hydrogen sulfide is added to the remaining portion of the organic solvent and this stream is introduced into the top of a reactor 13 where it joins the sulfur dioxide-laden solvent from the absorber 12 and effects the reaction between hydrogen sulfide and sulfur dioxide to produce elemental sulfur.

A second method for conducting the sweetening reaction is shown in Fig. 2. All of the concentrated sulfur dioxide-free organic solvent is introduced into the top of a sulfur dioxide absorber 12, there to effect recovery of this component from the residue gas. Liquid sulfur dioxide is pumped into the top of a reactor 13 where it mixes with sulfur dioxide-laden organic solvent from the absorber 12. The resulting a sulfur dioxide-solvent mixture descends through the reactor 13 and contacts the ascending sour gas, thereby effecting reaction between hydrogen sulfide and the sulfur dioxide.

A third modification is illustrated in Fig. 3, wherein the required quantity of sulfur dioxide, in either vapor or liquid form as required, is added to the stream of sour gas entering a reactor 13, and the entire stream of concentrated sulfur dioxide-free organic solvent is introduced into the top of a sulfur dioxide absorber 12, there to recover an excess of this component from the residue gas. The sulfur dioxide-laden solvent issuing from the absorber 12 is introduced into the top of the reactor 13 to effect the reaction between the hydrogen sulfide and the sulfur dioxide.

A fourth method and apparatus for carrying out the process of this invention is shown in Fig. 4, wherein sulfur dioxide-free organic solvent is introduced into the top of a sulfur dioxide absorber 12, there to recover the excess of this component from the residue gas. The sulfur dioxide-rich solvent is removed from the absorber 12 and heated in a still 14 and a reboiler 15 to strip the volatile components, including the sulfur dioxide, from the solvent. If the sour gas contains mercaptans, these are taken up by the organic solvent in the absorber 12 and stripped as volatile material in the still 14. The reconcentrated solvent is cooled in a heat exchanger 16 and pumped back to the top of the sulfur dioxide absorber 12, thus completing the cycle. A second separate stream of the same (or a different) sulfur dioxide-free solvent is used to effect solution of the sulfur dioxide stripped from the first solution above and introduced into the top of a reactor 13 to effect reaction between hydrogen sulfide and sulfur dioxide, the remainder of the required sulfur dioxide being introduced meanwhile into the reactor 13 by any one of the three methods recited above.

A fifth method, shown in Fig. 5, comprises introducing the required amount of sulfur dioxide-free concentrated organic solvent into the top of a first sulfur dioxide absorber 12, there to recover the excess of this component from the residue gas, which quantity may be substantially all or only a portion of the total solvent requirement for the process, removing said sulfur dioxide-enriched solvent from the bottom of the first absorber 12 and introducing it into a second sulfur dioxide absorber 17 to effect solution of any additional sulfur dioxide required in the reaction, pumping the required quantity of the same sulfur dioxide-free solvent to the top of the second absorber 17 to effect recovery of traces of sulfur dioxide from the flue gas passing upward through this vessel, combining the two solvent streams within the second absorber 17 into a single solvent stream in which is dissolved the sulfur dioxide required by the process, which stream is introduced into the top of a reactor 13 to effect the reaction between hydrogen sulfide and the sulfur dioxide, thereby producing elemental sulfur.

It is apparent that in the foregoing descriptions the sulfur dioxide absorber 12 may be superimposed on top of the reactor 13, either as a single pressure vessel comprised of the two separate and distinct sections, or the superimposed assembly may be two separate vessels connected by suitable piping permitting gravity flow of the solvent from the absorber to the reactor, or the two vessels may be set on a common elevation and the transfer of solvent from the absorber to the reactor may be effected by pumping through suitable connecting piping.

The reaction between hydrogen sulfide and sulfur dioxide is exothermic and, in any of the preferred forms of the invention listed above, the temperature rise in the reactor due to heat of the reaction may be limited and/or controlled if desired. For example, the extent of the temperature rise, based on sour gas entering the reactor at 80° F., contacting 98% diethylene glycol and sulfur dioxide as solvent entering the reactor at 100° F., and solvent concentration at the reactor outlet reduced to 95 percent by weight, is listed as follows:

| Percent H$_2$S in gas: | Max. reactor temperature |
|---|---|
| 1 | 120 |
| 10 | 202 |
| 20 | 217 |
| 40 | 226 |

If solvent concentration is decreased below 95 percent by weight, resulting from decreasing the quantity of solvent charged, the maximum temperatures will increase proportionately.

Fig. 6 is a flow diagram of one of the preferred methods for effecting separation of the elemental sulfur from the solvent, comprising maintaining the temperature of a reactor 13 in the range 100–150° F., for example, by use of reactor intercoolers (not shown), discharging the sulfur-laden slurry from the base of the reactor 13 to a sulfur heating and settling tank 18, applying heat to said tank 18 in quantity sufficient to control the temperature of its contents in the range 250–275° F., agglomerating and melting the sulfur particles and effecting separation of the slurry into a molten sulfur phase and an aqueous organic solvent phase, discharging the sulfur from the bottom of the settling tank 18 to storage or to a sulfur burner (not shown) as required, discharging the solvent to a still (not shown) for reconcentration, and discharging the sulfur dioxide vapors stripped from the slurry into the reactor 13 or into a sulfur dioxide absorber (not shown) for recovery and re-use by solution in the concentrated solvent.

Another method for separating elemental sulfur from the solvent is illustrated in Figs. 7 and 8, and comprises maintaining the reactor temperature in the desired range, flowing the sulfur-laden slurry from the base of a reactor 13 by gravity into a sulfur melting and settling tank 18 which is connected to the reactor 13 by means of liquid and vapor flow and equalizing conduits (not shown) so that the two vessels operate at the same pressure, applying heat to the settling tank 18 in quantity sufficient to maintain the temperature of its contents in the range 250–275° F., agglomerating and melting the sulfur particles and effecting separation of the slurry into a molten sulfur phase and an aqueous organic solvent phase, discharging the sulfur from the bottom of the tank 18 to storage or to a sulfur burner (not shown) as required, discharging the organic solvent to a still (not shown) for reconcentration, and discharging the sulfur dioxide stripped from the slurry back to the reactor 13 for use in that zone.

It will be understood that in the above descriptions the reactor 13 and the sulfur melting and settling drum 18 may operate at the same or different pressures. It is anticipated that the reactor 13 shall operate at any pressure required by the gas system it serves, but that the sulfur melting and settling drum 18 may operate at the same pressure or at a lower pressure, such as from 10 to 30 p.s.i.g., which pressure will be adequate to supply the necessary driving force to deliver the various streams to the desired points. In the second method discussed above for separating elemental sulfur, the sulfur melting and settling drum 18 can be an integral part of the reactor 13 if the capacity of the lower portion of that vessel is of adequate size, or the reactor 13 might be erected in a vertically disposed position at the center of the horizontally disposed melting and settling tank 18 with both vertical and horizontal portions fabricated into a single vessel, or the reactor 13 and the melting and settling tank 18 could be two separate vessels properly located with respect to each other and connected with a lower line to deliver slurry from the reactor 13 to the melting and settling drum 18, and a second line to deliver stripped sulfur dioxide vapors from the settling drum 18 to the vapor section of the reactor 13. In any of these alternatives, both vessels would operate at reactor pressure which, as stated above, is equal to the pressure of the gas system it serves.

The organic solvent from which the sulfur has been removed, contains excess water absorbed from the entering stream of sour gas and water from the reaction. This can be readily removed by further heating the solution and discharging it into a still whose base is maintained in the temperature range 250–500° F., depending on the particular organic solvent employed and the extent of reconcentration desired. Excess water passes overhead in the vapor form. The vapor may be cooled and the water condensed and removed from the system. The reconcentrated solution of organic solvent is withdrawn from the bottom of the still, cooled by heat exchange and pumped back to the absorber, thereby constituting a continuous process.

The following examples describe continuous processes which are applicable to commercial operations. These examples are intended solely to illustrate the invention and not to limit it in scope. They are directed to specific materials and conditions, but it will be apparent to those skilled in the art that many modifications of solvents and conditions may be made without departing from the invention.

*Example 1*

Referring now to Fig. 9 of the drawings, sour gas, which is usually saturated with water vapor, enters the bottom of a reactor 21 through an inlet line 22. The sour gas rises through the gas-liquid contacting devices of the reactor 21 counter-current to the downward flow of solvent solution, for example a 98% triethylene glycol solution. The solvent enters the reactor 21 through an inlet 29 near the top of the upper, absorbing section of the reactor 21. Sulfur dioxide is admitted to the top of the reactor section 21 through an inlet line 28, located some distance below the solvent inlet 29. Where a bubble cap tower is employed, this may be from 10 to 25 trays below the solvent inlet, depending on the extent to which the sulfur dioxide must be removed from the residue gas.

The quantity of sulfur dioxide entering the reactor 21 should be so regulated that the molar ratio of hydrogen sulfide to sulfur dioxide in the reactor 21 is slightly less than 2 to 1. A lower ratio may be employed as a safeguard against the escape of any hydrogen sulfide in the processed residue gas.

It will be observed that in this process all of the natural gas is in intimate contact with the absorbent, concentrated solution of organic solvent. Consequently, any moisture in the gas is removed along with hydrogen sulfide. The gas leaving through the outlet 32 at the top of the sulfur dioxide absorber section is therefore dry as well as free of hydrogen sulfide. The dried and sweetened gas is preferably passed through dual mist extractors 30 and 31 before leaving the column via the outlet 32 to minimize solvent loss by entrainment.

The dehydration of the sour gas and the chemical reaction between the dissolved sulfur dioxide and the rising stream of gas containing hydrogen sulfide takes place at a controlled temperature, preferably of 200° F. or less, largely in that part of the reactor between the sour wet gas inlet 22 and the sulfur dioxide inlet 28, denoted as the contact zone 23 in the drawing. Sulfur particles form in the solvent stream and are carried therein to the bottom or base 24 of the reactor column, whence it is discharged through the outlet 25, preferably under the control of a liquid level controller 27 and motor valve 26. The organic solvent leaving the column through the line 25 is diluted by water absorbed from the sour gas and also by water from the reaction. The solvent concentration may be thereby decreased to about 90% or lower, although it is preferred that the concentration be held at 95% or higher. In order to remove both the excess water and the sulfur from the solvent solution, it is next subjected to heating to remove the sulfur, and then to distillation to remove the water.

After leaving the base 24 of the reactor column 21, the dilute solvent is passed via a line 33 through heat exchangers 34 in order to raise the temperature to about 250° F. and coagulate the suspended sulfur particles. From the heat exchangers the solvent is discharged through a line 36 into a sulfur receiver 35. This receiver is heated by a closed steam coil 37, or other suitable heat source, to a temperature of 250–275° F. The receiver temperature must be controlled with care because molten sulfur becomes very viscous at higher temperatures. Within this receiver 35, the partially coagulated sulfur settles into the molten sulfur phase which is withdrawn to storage through the discharge line 38 by means of a valve 39 which is regulated by an interface controller 40. The dilute solvent solution is withdrawn from the sulfur receiver 35 through a line 41, in substantially sulfur-free condition. It is subjected to a further heating in a heat exchanger 42 and a pre-heater 43, and then it is fed into a stripping column 44 via an inlet line 45.

Within the stripping column 44, excess water is removed from the solvent, and is discharged from the column at its top via a vent 46 which may be controlled by a back-pressure valve 47 if super-atmospheric distillation is desired. As the organic solvent descends column 44, it becomes more concentrated as the temperature rises and excess water is vaporized and removed. At the base of the column the solvent is heated by a reboiler 48 to the temperature corresponding to the desired concentration at the column pressure, and is then discharged from the column 44 through a line 49, which is preferably regulated by a valve 50 under the control of a liquid level controller 51. This hot, concentrated solution may be passed through the previously mentioned heat exchangers 42 and 34, via the lines shown 52 and 53, in order to conserve thermal energy. The concentrated solvent may now be returned directly to the sulfur dioxide absorber for reuse, after cooling. A solvent storage and surge tank 54 is provided in order to provide for constant operation of the system. Solvent from the heat exchangers 34 is discharged into the surge tank through a line 55 and/or to pump 57 through a line 58. The required quantity of solvent is passed through a pump 57, into a cooler 59, via line 60, and thence to the reactor 21 through the inlet 29, thus completing the cycle. The storage tank 54 is provided with an outlet valve 56 for withdrawal of solvent directly.

The reaction between the hydrogen sulfide and sulfur dioxide which takes place in the reactor will go forward under a wide range of operating conditions. For example, the process is not adversely affected by pressures in the range from atmospheric pressure to 3000 p.s.i.g., at temperatures as high as 260° F., although the efficiency of the process may be improved if the temperature is regulated within a range of about 100° F. to about 150° F. As with any chemical process, the operating conditions may be varied to achieve optimum yields. For example, an excess of sulfur dioxide of 10% to 20% over the theoretical amount may be adequate for the treatment of truly sour gases in a reactor of proper design. However, where the sour gas has a low hydrogen sulfide content, on the order of 1 to 20 grains of hydrogen sulfide per hundred cubic feet, a very substantial excess of sulfur dioxide over the stoichiometric requirement may be necessary for complete sweetening of the gas. Similarly, the organic solvent should be reactivated at temperatures appropriate to the particular solvent employed. For instance, when diethylene glycol is employed, a reboiler temperature in the range between 320° F. and 330° F. produces good results. When triethylene glycol is employed, the temperature may be between 350° F. and 400° F. These and other optimum operating conditions are either readily determinable from physical data or are obvious to those skilled in the art, once the basic invention is disclosed.

The sulfur dioxide for the reaction may be obtained in a variety of ways. It may be obtained by controlled burning of some of the product sulfur, in which case it may be introduced into the absorber column in either gaseous or liquid form, depending on system pressure requirements. Alternatively, the sulfur dioxide may be pre-dissolved in an organic solvent and may be pumped to the column in the form of a solution. Still another alternative would be to remove a portion of the hydrogen sulfide from the sour gas by the conventional amine reaction, oxidize it, and utilize the sulfur dioxide in the reaction. This last possibility tends to defeat the purposes of the invention to some extent when treating natural gas, but is highly desirable when treating acid gases from an amine-type desulfurizer or natural gases with high nitrogen or carbon dioxide contents to effect sulfur recovery.

*Example 2*

An industrial application of the invention is shown in Fig. 10 of the drawings which disclose a system wherein natural gas, containing 6.5 percent hydrogen sulfide, is treated at a rate of ten million standard cubic feet per day at a pressure of 500 pounds per square inch to yield 24.5 long tons of sulfur and 9,350 M c.f. of dry, sweet natural gas for pipe line sale.

Referring to Fig. 10, sour natural gas, at a pressure of 500 p.s.i.g. and a temperature of 80° F., enters a reactor 101 via a line 102 and passes upward through the gas-liquid contacting elements of this vessel where it is contacted by a descending stream of sulfur dioxide dissolved in diethylene glycol monoethyl ether, a solvent more commonly known as "Carbitol." This solution, at the rate of 100 gallons per minute, carries an excess of sulfur dioxide into the reactor 101 via a line 103 to insure complete reaction of all hydrogen sulfide contained in the inlet gas stream. The reaction between sulfur dioxide and hydrogen sulfide is immediate and complete at the gas-liquid interface and the sulfur formed in the reaction descends the reactor column 101 with the solvent in the form of a slurry. At the rate of flow specified here, the heat of reaction causes the temperature of the reacting mixture to rise to approximately 188° F. prior to accumulating in the base of the reactor 101. At this latter point, additional heat is applied through a coil 101a in sufficient quantity to increase the temperature of the slurry to approximately 260° F., at which temperature the sulfur particles coalesce and melt. Liquid sulfur settles into a lower liquid phase while the solvent forms the upper liquid phase. At 260° F. any sulfur dioxide remaining in solvent is stripped out and passes upward through the reactor column 101 where it may react with the sour gas continuously entering the column via the line 102, thus forming additional sulfur. Liquid sulfur, free from solvent, is withdrawn from the reactor 101 via a line 104 and passes into storage via a line 105, except for that portion which is directed to the sulfur burner via a line 106. Hot, sulfur-free solvent, which now contains water formed as a product of the reaction, passes at the rate of 97 gallons per minute from the reactor 101 via a line 107 and heat exchangers 108 and 109 and is discharged into the inlet of a still column 110 wherein the water is distilled overhead and discharged from the system via a line 111. The remainder of the solvent is further heated and regenerated in a reboiler 112, from which point it is discharged via a line 113, the heat exchanger 108 and a cooler 114 to a concentrated solvent storage tank 115 which operates at substantially atmospheric pressure and temperature.

Sour gas rising through the reactor 101 reacts with, and is cooled by, the sulfur dioxide-laden stream of solvent which enters the reactor via the line 103. The hydrogen sulfide-free gas passes from the reactor 101 via a line 116 and a cooler 117 wherein its temperature is reduced to the minimum level attainable with plant cooling water (approximately 95° F.) prior to entering a high pressure (500 p.s.i.g.) sulfur dioxide absorber 118. The gas rises through gas-liquid contacting devices within this column where it is contacted by a down-flow of concentrated, sulfur dioxide-free solvent introduced into the absorber 118 from the tank 115 via a pump 119 and a line 120 at the rate of 95 gallons per minute. This concentrated solvent descends the absorber 118, effecting recovery of excess sulfur dioxide and water vapor from the gas and reducing the residual content of this compound to 0.25 grain per hundred standard cubic feet, or less, as the sweet, dry residue gas passes from the absorber via a line 121 en route to market.

Solvent containing some water and sulfur dioxide in solution accumulates in the base of the absorber 118, whence it is discharged at the rate of about 96 gals./min. via a valve 122 and a line 123 into the upper portion of a low-pressure (approximately 5 p.s.i.g.) sulfur dioxide absorber 124. Descending this column, the solution absorbs the remaining sulfur dioxide requirement from the flue gas entering the absorber 124 via a line 125, and collects in the bottom of the absorber 124 whence it is discharged at a temperature of about 100° F. to the upper portion of the reactor 101 via a line 126, a pump 127 and the line 103, thus completing the solvent cycle.

Approximately one-third of the total liquid sulfur discharged from the bottom of the reactor 101 via the line 104 is diverted via the heat-jacketed line 106, maintained at a temperature of at least 260° F., to a sulfur burner 128 where it is oxidized with air from a compressor 129 which is connected to the burner 128 by a line 130. Hot flue gas (approximately 2100° F.) passes from the sulfur burner via a line 131 to a waste heat boiler 132 where a portion of its heat content is utilized in the generation of process steam. The flue gas passes from the boiler 132 at a substantially lower temperature (about 700° F.) via a line 133, the heat exchanger 109 and a cooler 134 en route to the inlet to the low-pressure sulfur dioxide absorber 124 via the line 125. Residue flue gas is discharged from the absorber 124 via a line 135 and, being essentially nitrogen, is vented to the atmosphere.

It will be noted that this illustration of the sulfur recovery process differs from certain of the others presented heretofore, since the concentrated sulfur-free organic solvent flows first to the high-pressure sulfur dioxide absorber, thence to the low-pressure sulfur dioxide absorber to complete dissolution of this reactant, and is then pumped to the reactor where the reaction takes place and recovery of elemental sulfur is effected.

*Example 3*

Another embodiment of this invention is shown in Fig. 11 in which the acid gases produced by a large amine-type gas sweetening plant are processed for sulfur, replacing the conventional Claus process. The illustrated installation will process 4,000 M c.f. per day of acid gas whose composition is 25 percent hydrogen sulfide and 75 percent carbon dioxide and which enters the sulfur recovery system at 10 p.s.i.g. and 100° F.

Referring to Fig. 11, acid gas from an amine-type sweetening plant enters the sulfur recovery system via a line 201, connected to a three-way valve 202. At the valve 202, the acid gas is split into two streams. The stream entering line 203 is twice the size of the stream entering line 204. The line 204 connects with a line 205 through which compressed air from a compressor 206 passes. The mixture of acid gas and air in the line 205 is introduced into a catalyst chamber 207 where the mixture of gases passes through a hot catalyst bed containing silica, bauxite or aluminum-nickel on pumice at 480–520° F. The amount of air from the compressor 206 is regulated with respect to the amount of hydrogen sulfide in the line 204 so that sufficient oxygen is present in the catalyst chamber 207 to oxidize the hydrogen sulfide completely to sulfur dioxide and water vapor. At the acid gas rate prescribed above, 2500 M c.f. of air per day is required. The mixture of sulfur dioxide, carbon dioxide, nitrogen, water vapor and traces of other gases which issues from the catalyst chamber 207 passes via a line 208 through a cooling tower 209 and a line 210 into a reactor 211.

Acid gas is introduced into the reactor 211 by way of the line 203, which is connected to the reactor 211 adjacent the line 210 carrying the stream of sulfur dioxide admixed with other gases. The hydrogen sulfide introduced through the line 203 mixes inside the reactor 211 with the sulfur dioxide introduced through the line 210. This mixture of gases passes upward through the reactor 211, contacting a descending stream of a suitable organic solvent, such as triethylene glycol, which may contain sulfur particles and some sulfur dioxide in solution. Cool, concentrated, sulfur dioxide-free solvent is pumped into the top of the vessel 211 via a nozzle 212 and the upper portion of vessel 211 serves as an absorber for unreacted sulfur dioxide which may tend to escape the reactor with the residue gas. In this instance, cool concentrated solvent is pumped into the absorber-reactor at a rate of approximately 140 gallons per minute so that the residue gas leaving the vessel via a line 213 is quite thoroughly dehydrated and denuded of sulfur dioxide. Proper control of operating conditions should produce an inert residue gas which might be processed for its carbon dioxide content or used for other purposes where an inert, dry gas is required.

Sulfur-laden solvent accumulating in the base of the reactor 211 flows to a slurry decanter and melt tank 215 via a line 214. Here the slurry is heated to 250–275° F. by hot solvent passing through a heating element 216 inserted through one end of the melt tank 215. Sulfur particles melt, agglomerate and settle into the lower, molten sulfur phase while the solvent rises to form the upper layer. Any dissolved gases such as sulfur dioxide are stripped from solution and are discharged back to the reactor 211 via a line 217. Molten sulfur is withdrawn from the system and run to storage via a line 218 while decanted solvent is withdrawn from the melt tank 215 via a line 219, picks up heat in exchangers 220 and is discharged into a solvent still 222 via a line 221. Here, the liquid portion of the feed descends the still and is contacted by rising vapors, principally steam, to the extent that excess water is stripped from solution and passes overhead from the still 222 via a vapor line 223, a condenser 224 and accumulates in a reflux drum 225. Such water as may be required for reflux passes to a reflux pump 227 via a line 226 whence it is lifted via a line 228 and discharged into the top of the still 222 via a nozzle 229. Proper use of water as reflux prevents the loss of excessive quantities of solvent in the still overhead. Excess water from the reflux drum 225 may be treated and used, or wasted as circumstances require. Noncondensible gases are vented from the reflux drum 225 via a line 230.

Solvent descending the still 222 accumulates on a chimney tray 231 and passes to twin reboilers 233 via lines 232. Here the solvent temperature is raised to the desired level, such as approximately 400° F. for triethylene glycol, and any vapors so generated are vented from the reboilers 233 via line 234 and discharged into the lower portion of the still 222 whence they pass upward through the chimney tray 231 to contact the descending solvent stream.

Hot solvent is withdrawn from the base of the still 222 via a line 235 en route to a hot solution pump 236. Solvent discharged from the pump 236 may pass either into the heating element 216 of the melt tank 215 via a line 237, or may be diverted by a valve 238, under control of a recording temperature controller 239 installed in the melt tank 215, to the heat exchangers 220 via a line 240. Emerging from the heat exchangers 220, the cooler solvent passes to a tubular cooler section 242, located in the lower portion of a cooling tower 243, via line 241. Here the solvent is cooled to approximately 100° F. and is directed to the upper portion of the absorber-reactor vessel 211, entering at the nozzle 212 via a line 244.

Cooling water from the basin of the cooling tower 243 is pumped over the tower by a pump 245 which may, if required, pump a portion of this water through reactor intercoolers 246 and 247 located in the absorber-reactor 211. By this means, control of reactor temperatures may be accomplished at a level which favors the reactions therein.

The system described here should produce approximately 38 long tons of sulfur per day and 5,000 M c.f. of dry, inert residue gas whose composition is approximately 60 percent carbon dioxide and 40 percent nitrogen with traces of oxygen. In addition, operation of the process will produce about 6500 gallons of water which might be utilized to good advantage in areas where water is scarce. Energy requirements approximate 150 brake horsepower for pumps and compressors and 170 M c.f. per day of fuel gas for reboiler service.

What is claimed as new and is desired to be secured by Letters Patent of the United States is:

1. In the process of removing hydrogen sulfide from a gaseous mixture by reaction with sulfur dioxide, the improvement which comprises carrying out the reaction in a solvent comprising a concentrated aqueous solution of an inert, neutral, stable, organic solvent having a vapor pressure at 20° C. of not more than about 10 millimeters of mercury and wherein the solubility of water in said organic solvent is not less than about 2% by weight at 20° C., said organic solvent being further characterized by containing at least two hereto atoms, at least one of which is a lower chalcogen, and by containing not more than two vicinyl hydroxyl radicals.

2. The method of claim 1 wherein the organic solvent is selected from glycols and esters and ethers thereof.

3. The method of claim 1 wherein the organic solvent is a glycol.

4. The method of claim 1 wherein the organic solvent is triethylene glycol.

5. The method of claim 1 wherein the organic solvent is diethylene glycol.

6. The process of removing hydrogen sulfide from a gaseous mixture which comprises contacting said gaseous mixture with sulfur dioxide in a solvent comprising a concentrated aqueous solution of an inert, neutral, stable, organic solvent having a vapor pressure at 20° C. of not more than about 10 millimeters of mercury and wherein the solubility of water in said organic solvent is not less than about 2% by weight at 20° C., said organic solvent being further characterized by containing at least two hereto atoms, at least one of which is a lower chalcogen, and by containing not more than two vicinyl hydroxyl radicals, whereby reaction between the hydrogen sulfide and the sulfur dioxide is rapid and sulfur particles are precipitated in the reaction medium.

7. The process for removing hydrogen sulfide and water vapor from a sour wet gas which comprises contacting the sour wet gas with sulfur dioxide in a solvent comprising a concentrated aqueous solution of a glycol whereby the sulfur dioxide and hydrogen sulfide react to form a precipitate of sulfur particles in the liquid.

8. The process of claim 7 wherein the solvent is a concentrated aqueous glycol solution containing at least 90% glycol.

9. The process of claim 8 in which the glycol is triethylene glycol.

10. The process of claim 8 in which the glycol is diethylene glycol.

11. A continuous process for removing hydrogen sulfide from a sour gas mixture which comprises contacting said sour gas mixture with sulfur dioxide in a solvent comprising a concentrated aqueous solution of an inert, neutral, stable, organic solvent having a vapor pressure at 20° C. of not more than 10 millimeters of mercury and wherein the solubility of water in said organic solvent is not less than about 2% by weight at 20° C., said organic solvent being further characterized by containing at least 2 hetero atoms, at least one of which is a lower chalcogen, and by containing not more than 2 vicinyl hydroxyl radicals, maintaining the sulfur dioxide in such concentration that there is at least one mole of sulfur dioxide present for every two moles of hydrogen sulfide in the sour gas being treated, and removing from the organic solvent the sulfur particles precipitated in said solvent by reaction of the hydrogen sulfide and sulfur dioxide.

12. A continuous process for removing hydrogen sulfide from a sour gas mixture as defined in claim 11 wherein the organic solvent is a glycol.

13. A continuous process for removing hydrogen sulfide from sour gas mixtures comprising dissolving sulfur dioxide in a concentrated aqueous glycol solution containing at least 90% glycol, washing the sour gas mixture with the aqueous glycol solution of sulfur dioxide, maintaining the sulfur dioxide in such concentration in the wash solution that there is at least one mole of sulfur dioxide in the wash solution for every two mols of hydrogen sulfide in the sour gas, and removing from the glycol the sulfur particles precipitated in the glycol solution by the reaction of the hydrogen sulfide and sulfur dioxide.

14. The process of claim 13, including the additional steps of removing excess water from the glycol solution to reconcentrate the solution to at least 90% aqueous glycol, and recycling the concentrate in the process.

15. The process of claim 13 in which the glycol solution is an aqueous solution of triethylene glycol.

16. The process of claim 11 in which the precipitated sulfur is removed from the reaction medium by the additional steps of heating the solution to a temperature not less than the melting point but below the sublimation temperature of sulfur to cause agglomeration of the sulfur particles, allowing the sulfur to settle, and separating from the sulfur the supernatant solution by decantation.

17. The process of simultaneously sweetening and dehydrating a sour, wet gas containing hydrogen sulfide comprising intimately contacting said wet, sour gas with sulfur dioxide and a concentrated aqueous solution of a hygroscopic glycol.

18. The process for treating a wet, sour gaseous mixture containing hydrogen sulfide comprising intimately contacting the wet, sour gaseous mixture with a solution of sulfur dioxide in an aqueous solution of a hygroscopic glycol of at least 90% glycol concentration, whereby sulfur particles are precipitated and moisture is absorbed in said glycol solution, and heating said glycol solution to agglomerate sulfur and remove excess sulfur dioxide and absorbed moisture.

19. A continuous process for recovering sulfur from a sour gas mixture containing hydrogen sulfide which comprises admixing with said sour gas a stream of gas containing one-half mole of oxygen per mole of hydrogen sulfide present in said sour gas mixture, oxidizing one-third of the hydrogen sulfide to sulfur dioxide, reacting the sulfur dioxide thus produced with the remainder of the hydrogen sulfide in a solvent comprising a concentrated aqueous solution of an inert, neutral, stable, organic solvent having a vapor pressure at 20° C. of not more than 10 millimeters of mercury and wherein the solubility of water in said organic solvent is not less than about 2% by weight at 20° C., said organic solvent being further characterized by containing at least 2 hetero atoms, at least one of which is a lower chalcogen, and by containing not more than 2 vicinyl hydroxyl radicals, and removing from the organic solvent the sulfur particles precipitated in said solvent by reaction of the hydrogen sulfide and sulfur dioxide.

20. The process of claim 19 wherein the organic solvent is a glycol of at least 90% concentration by weight.

21. The process of claim 19 wherein the organic solvent is triethylene glycol of at least 90% concentration by weight.

22. In the process of removing hydrogen sulfide from a gaseous mixture by reaction with sulfur dioxide to form sulfur, the improvement which comprises carrying out the reaction in a solvent comprising a concentrated aqueous solution of an inert, neutral, stable, organic solvent having a vapor pressure at 20° C. of not more than about 10 millimeters of mercury and wherein the solubility of water in said organic solvent is not less than about 2% by weight at 20° C., said organic solvent being further characterized by containing at least two hetero atoms, at least one of which is a lower chalcogen, and by containing not more than two vicinyl hydroxyl radicals, then heating said solvent to a temperature above the melting point of the sulfur but below the sublimation point of the sulfur to cause agglomeration of the sulfur, allowing the sulfur to settle and separating the sulfur from the supernatant liquid.

23. The process of claim 22 wherein the organic solvent is a glycol of at least 90% concentration by weight.

24. The process of claim 22 wherein the organic solvent is triethylene glycol of at least 90% concentration by weight.

References Cited in the file of this patent

UNITED STATES PATENTS

| | | |
|---|---|---|
| 927,342 | Feld et al. | July 6, 1909 |
| 1,672,924 | Bacon | June 12, 1928 |
| 1,900,398 | Jacobson | Mar. 7, 1933 |
| 2,043,084 | Ward et al. | June 2, 1936 |
| 2,139,375 | Millar et al. | Dec. 6, 1938 |
| 2,729,543 | Keller | Jan. 3, 1956 |

FOREIGN PATENTS

| | | |
|---|---|---|
| 430,865 | Great Britain | June 26, 1935 |